Patented Apr. 23, 1946

UNITED STATES PATENT OFFICE 2,398,837

PRODUCTION OF BUTYL ALCOHOL AND ACETONE BY FERMENTATION

Elizabeth F. McCoy, Madison, Wis., assignor to Wisconsin Alumni Research Foundation, Madison, Wis., a corporation of Wisconsin No Drawing. Application July 30, 1940,
Serial No. 348,543

8 Claims. (Cl. 195—46)

This invention relates to an improvement in the art of manufacture of butyl alcohol and acetone by fermentation of carbohydrate-bearing solutions. More particularly, it relates to the production of butyl alcohol and acetone from suitable molasses mashes by the agency of a certain bacterium, hitherto unknown and hereafter referred to as *Clostridium madisonii*. My invention relates also to a process for modifying the ratio of butyl alcohol and acetone produced in the fermentation by certain butyl alcohol and acetone producing bacteria.

SOURCE

The original strain of *Clostridium madisonii* was obtained from a particular sample of field soil, collected in the vicinity of Madison, Wisconsin, but it is anticipated that the same type of bacteria may be found in other soils, or on plant parts such as cereal grains, potatoes, root vegetables and the like. Isolation may be accomplished by enrichment in sugar-bearing medium such as Winogradsky's medium or molasses mash similar to that to be described below. Final purification is by the usual bacteriological method of plating and picking of colonies or by single-cell isolation.

DESCRIPTION OF CLOSTRIDIUM MADISONII

In the following description the terms and expressions are those currently used in bacteriology and thus will be readily understood by those skilled in the art. It being impracticable to list all of the methods used, it should be stated that except as specifically mentioned below the tests and methods employed are those of the Descriptive Chart and Manual of Methods for Pure Culture Study of Bacteria, published by the Society of American Bacteriologists. The few exceptions are called for by the anaerobic nature of the organism in question, and are either self-explanatory or familiar methods of anaerobiosis. It is self-evident that in testing of the growth and metabolic activity of the culture conditions will be as nearly as possible optimum for the species.

Morphology

1. Form: Culture on potato-glucose medium. Age 20 hrs. for vegetative forms; 72 hrs. for spores. Nigrosin stain.
    Vegetative cells: long or short rods. Short chains or single. Ends rounded. Size: 3.0–5.8$\mu$ by 0.5–1.0$\mu$; average 4.2$\mu$ by 0.6$\mu$.
    Sporangia: Elongated and spindle-shaped.
    Endospores: Abundantly formed. Cylindrical to ellipsoidal. Subterminal to terminal. Size: 1.3–2.4$\mu$ by 0.7–1.3$\mu$; average 1.9$\mu$ by 1.0$\mu$.
2. Gram reaction: positive, becoming negative in old cultures.
3. Motility: active in young cultures, sluggish or none in old cultures.
4. Granulose: positive in young clostridia, disappearing as sporulation sets in.

Cultural features

1. Agar colonies: On molasses-glucose agar. 2 days. Dark cream, round, entire, viscid and raised to convex.
2. Agar stroke: Medium as above. Moderate, glistening, confluent.

Physiology

1. Relation to oxygen: anaerobic.
    This implies that for surface growth cultures must be prepared in absence of free oxygen; i. e., in anaerobic jars. In deep cultures in test tubes or flasks or tanks growth is possible in vessels open to the air provided that a strong inoculum is used in a suitable highly reducing medium.
2. Relation to temperature:
    Range: 8–42° C. for growth; 31° C.±2° optimum for fermentation.
3. Relation of pH of medium:
    Range: 4.3–7.6 for growth; apparent optimum for fermentation pH 5.0–6.0, preferably about pH 5.5.
4. Gelatin liquefaction: negative.
    Tested on plain nutrient gelatin, glucose (0.25%) gelatin, Bredemann gelatin, and Frazier plates. 30 days allowed.
5. Litmus milk: reduced before curdling; moderate gassing; soft acid curd with turbid pink whey. White crystals develop in old cultures. No digestion of casein in tube or on milk agar plate test.
6. Von Hibler brain, plain or with iron: negative. Growth with gassing and sporulation but no blackening or digestion.
7. Hydrogen sulphide production:
    Lead acetate agar: toxic, little or no growth.
    Plain or glucose peptone water: no $H_2S$ by strip test.
    Brain mash: no $H_2S$ by strip test.
    Thiosulphate brain mash: positive $H_2S$ by strip test.
    Sulphite brain mash: positive $H_2S$ by strip test.
    Oatmeal (5%) mash: positive $H_2S$ by strip test.
    Sulphate broth (Speakman's): no $H_2S$ by strip test.
8. Indole production:
    Difco peptone-glucose broth: no indole.
    Difco tryptone-glucose broth: no indole.
    Tested by Ehrlich and Salkowski methods.

9. Nitrate reduction:
   Plain nitrate broth: no reduction.
   Synthetic nitrate broth (Soc. Amer. Bact. Manual formula): no reduction.
   Nitrate-glucose broth: no reduction.
   Tested after 3 and 5 days by α-naphthylamine and sulphanilic acid method.
10. Blood agar:
    Glucose agar with 10% defibrinated horse blood: good growth, no hemolysis but zone surrounding colonies discolored by acid.
11. Fermentation reactions:
    Tests run on Speakman's base with tryptone plus sugars. 1% sugar or related carbohydrate in 10 cc. broth under Vaseline seal; 1 week's incubation at 30° C. Acid and gas recorded semiquantitatively from + to +++.

| Carbohydrate or related compound | Reaction |
|---|---|
| Arabinose | + + |
| Xylose | + |
| Rhamnose | − |
| Glucose | + + + |
| Galactose | + + |
| Mannose | + + |
| Fructose | + + + |
| Sucrose | + + + |
| Maltose | + + + |
| Lactose | + + |
| Trehalose | + + + |
| Raffinose | + |
| Melezitose | + + |
| Soluble starch | + + |
| Corn starch | + + |
| Dextrin | + + |
| Inulin | + + |
| Glycogen | + + |
| α-methyl glucoside | + + + |
| Salicin | + |
| Amygdalin | + + |
| Esculin | + + |
| Glycerol | − |
| Mannitol | + + + |
| Sorbitol | + + |
| Erythritol | − |
| Quercitol | − |
| Dulcitol | − |
| Inositol | + |
| Cellulose | − |
| Control (base medium alone) | − |

*Clostridium madisonii* has been compared by serological agglutination with the organism of my previous Patent No. 2,110,109, and with my large collection of historical butyl and butyric organisms, and it is found to be different antigenically by the agglutination and agglutinin absorption tests.

In the normal operation of this invention, a mash is used in which molasses serves as the essential substrate, which in this case should be of about 5 to 5.5 per cent sugar content. While it is my intention to use cane molasses of the grade known commercially as blackstrap of either plantation or refinery origin, it is to be distinctly understood that such is not the only fermentable molasses. "High test" cane molasses having in the range of 70 per cent sugar may, of course, be used with only such adjustment in the mashing as may be dictated by the differences in its composition, all of which is readily apparent to those skilled in the art or may be quickly determined by trial. Beet sugar molasses, if commercially available in sufficient quantity or at favorable price, may also be employed. Nor is the geographical origin of the molasses any limitation upon its usefulness in the process; samples from Cuba, Puerto Rico, Hawaii, and Louisiana, for example, have been successfully fermented by *Clostridium madisonii*. All this is so because the prime purpose of the molasses in the mash is to serve as substrate for the fermentation; i. e., to furnish the carbohydrate from which the butyl alcohol and acetone and other valuable products are produced.

It is common practice to add supplementary nutrients, and their kind and amount may readily be judged by one skilled in the art by consideration of the analysis of any given molasses. In general, some nitrogen, preferably in the form of soluble ammonium salts or ammonia, may be added when necessary, and a non-toxic neutralizing agent, such as calcite, if needed. The addition of phosphate may also be advisable depending upon the amount carried by the molasses. In case of need, any suitable phosphate salt, such as $(NH_4)_2HPO_4$ or $CaH_4(PO_4)_2$ or $K_2HPO_4$, may be employed.

In addition to these supplementary nutrients to molasses mashes, certain conditions are preferable to insure vigorous and consistent fermentation with large yield of the desired end products. A prime necessity of successful operation is the development of a strong starter culture. For maintenance of stock culture I have found it desirable to pick a culture at the height of its efficiency, to induce sporulation of it, and to store the spores dried upon sterile soil until wanted. Vigorous starter cultures may then be brought out by allowing the spores to germinate in a medium such as glucose-maltsprouts, or glucose-potato, or glucose-liver broth. Certain provisions for anaerobiosis, as use of fresh culture medium in deep layers with or without added reducing agents, e. g., reduced iron, and the precaution of "pasteurizing" the spores by heating at 80° C. for ten minutes should be made at this stage to insure prompt germination and vigorous growth.

From this point on the starter culture is built up by a series of culture generations at approximately 30° C. for approximately 18–24 hours in molasses mashes similar to those to be fermented in the final stage. Such a sequence serves to "acclimatize" the culture to the molasses upon which it is to act in the fermenter, and at the same time furnishes a sufficiently large volume of inoculum for the plant operation. This is important because, while it is found possible that a fermenter could be started with a single test tube culture, or indeed with some of the spores from the soil stock, it is in practice necessary for the sake of consistency and speed of fermentation, to use as starter a large volume of an actively-fermenting vegetative culture. In general, 2–7 per cent by volume of starter for the final fermenter is advisable; the higher percentage appreciably reduces the time of fermentation. One precaution, however, is to be noted. It is inherent in the physiology of butyl organisms that a long vegetation in a medium such as the molasses mashes here proposed for fermentation is unfavorable for the organism. This is evidenced by decreased speed and efficiency of fermentation. It is essential in the success of my process therefore that the starting culture be derived from resting spores and that it be built up in volume by as few stages as possible in preparation for the final fermenter.

As for the plant conditions, properly sterilized mashes are to be used at all stages and aseptic precautions are to be taken in all transferring of the culture. A temperature of 31° C., ±2° C., is preferred for the maximum production of solvents in a minimum of time, but this organism appears to withstand slightly higher temperatures than do many other butyl organisms.

Example I

The following experiment will illustrate the use of Cuban blackstrap molasses in suitable mash for fermentation.

| | |
|---|---|
| Cuban blackstrap (6% as total invert sugar) gm | 1530 |
| NH₄OH (commercial conc.) cc | 6 |
| (NH₄)₂SO₄ gm | 33 |
| CaCO₃ gm | 63 |
| Tap water liters | 15 |

Sterilization of the above formula was accomplished by subjecting the mash in a 20 liter carboy to 17 lbs. gauge steam pressure for 25 minutes. The reaction of the mash after heating was pH 6.05. With inoculum at 3% by volume on the mash to be fermented and a fermentation period of 48 hours, a yield of 28% total solvents was obtained. By fractionation of the oil these solvents were found to be:

| | Per cent |
|---|---|
| Butyl alcohol | 76.1 |
| Ethyl alcohol | 6.0 |
| Acetone | 17.9 |

Example II

It is sometimes desired for vigor of fermentation to carry out the fermentation in the presence of certain growth stimulating substances. Certain vegetable tissues are rich in these substances and may be used in small amounts with good success.

| | |
|---|---|
| Puerto Rican molasses | 5% as invert sugar |
| (NH₄)₂SO₄ | 5% calc. on wt. sugar |
| CaCO₃ | 3% calc. on wt. sugar |
| K₂HPO₄ | 1% calc. on wt. sugar |
| Malt sprouts | 0.5% calc. on wt. sugar |

On this medium the yield of solvents on the sugar was 28% in one experiment; 29.5% in another. The ratio of solvents was here determined as:

| | Per cent |
|---|---|
| Butyl alcohol | 75.7 |
| Ethyl alcohol | 4.02 |
| Acetone | 19.75 |

In still other experiments soya bean meal at 0.5% and yeast at 0.5–1.0% were tried but with no advantage over malt sprouts.

Example III

It is sometimes desired to vary the concentration of sugar in the mash to be fermented. In such case, the other constituents of the mash, particularly the amount of neutralizing agent required, must be adjusted accordingly. The following example will illustrate:

| | Medium | | | |
|---|---|---|---|---|
| | I | II | III | IV |
| | Grams | Grams | Grams | Grams |
| Cuban molasses | 132.6 | 144.7 | 156.7 | 168.8 |
| (NH₄)₂SO₄ | 2.8 | 3.1 | 3.4 | 3.7 |
| CaCO₃ | 5.2 | 5.7 | 6.2 | 6.7 |

Tap water to 1300 cc.

With 4% inoculum and the fermentation carried through at 31° C. for 46 hours, the following yields were obtained:

| Medium | Total solvents |
|---|---|
| | Percent |
| I | 29.7 |
| II | 26.9 |
| III | 23.5 |
| IV | 22.1 |

Example IV

While it is true that starch is utilized when presented as soluble starch or corn starch in suitable base medium, as listed above under description of the organism, it is not necessarily true that fermentation of starch results in high yields of solvents. Corn mash, while it supports growth, is not a suitable substrate for solvent production but it can be modified by addition of ammonium salts and neutralizing agent so as to give fair yields. Or it can be combined with molasses in such a way as to furnish a part of the carbohydrate of the otherwise suitable mash. The following figures will illustrate:

| | Yield, per cent total solvents |
|---|---|
| Corn mash (6%) | 0.16 |
| Corn mash (6%) | |
| (NH₄)₂SO₄ (0.2%) | 17.3 |
| CaCO₃ (0.4%) | |
| Corn mash (3%) | |
| Molasses (3%) | |
| (NH₄)₂SO₄ (0.2%) | 19.1 |
| CaCO₃ (0.4%) | |

These figures prove that *Clostridium madisonii* ferments starch, if presented with suitable supplementary nutrient in the mash, and while it may not now be economically profitable to carry out such fermentations of starchy mashes, it is desired to point out that starch fermentation is within the potentialities of the organism.

All of the foregoing discussion of *Clostridium madisonii* as an agent of butyl fermentation applies to the case of its normal operation in the fermentation mash. It has been known for some years that butyl organisms in general, and it is true with respect to *Clostridium madisonii* also, are subject to the antagonism of an agent which is filterable through filters retaining bacteria and which has been called a bacteriophage or virus. Indeed the antagonism of this agent in the past has been considered a serious hazard in plant operation, and attempts have been made to so treat the natural organisms as to make them resistant enough to operate in the presence or potential presence of the filterable agent. I have now found a simple and sure treatment for preparing *Clostridium madisonii* for commercial use. It is a feature of my invention that the organism is rendered resistant to the filterable agent and simultaneously certain changes in the natural organism are induced which render it capable of adjustment to different ratios of production of butyl alcohol and acetone. These results are obtained by utilizing a special medium during the treatment with the virus, whereby selection is made of a strain having the necessary resistance to the filterable agent and capable of production of butyl alcohol and acetone in the desired ratio. This special medium is prepared of 200 cc. of liver extract, which is made by infusion of fresh liver at the rate of 500 gm. per liter of water; Bacto trytone 5 gm., glucose 5 gm., distilled water to 1000 cc. This broth is adjusted to about pH 7.2 or thereabout, and is placed in approximately 10 cc. amounts in test tubes containing chunks of the ground liver tissue left from the infusion above. This medium differs from the usual commercial fermentation mashes which have previously been used as the medium for deriving resistant strains of the butyl organisms in several details, notably in its high nitrogen content, its relatively low carbohydrate, and particularly in the well-known and important growth stimulants provided by the liver. In this medium as much as 1 cc. of the virus filtrate of high titer, say one part in one hundred million, is added aseptically to 10 cc. of medium at the time inoculation with Clostridium madisonii is made. It is to be remarked that this high concentration of virus is not inhibitory in the special liver medium, although in the usual molasses mash as little as one part in one hundred million, the so-called titer, is definitely inhibitory.

Growth is allowed for about 24 hours and the culture is transferred to a new tube of the special liver medium, i. e., in vegetative state and without waiting for sporulation. Such is the protective action of the liver medium that a second virus treatment of equal intensity may immediately be given. It is found that the culture may already be sufficiently resistant in this second culture generation but it is desirable for the sake of complete and permanent resistance that the procedure be continued preferably through 3 to 5 transfers, with the culture always in the vegetative state and with the virus added at each transfer. It is the remarkable result of this treatment that the organisms grow with increasing vigor and shown no deleterious effects of the concentrated virus dosage. The final culture is resistant to the filterable agent, as shown by tests in molasses mash in which it was formerly susceptible. It is then allowed to sporulate and, when ripened spores are present, is transferred by pipette to sterile soil, dried and stored. This spore stock is then ready for use and is the source of starter cultures for the commercial fermentation, as hereinbefore described.

It is the general impression that the ratio of solvents is a determining characteristic of a given butyl organism proposed for use in commercial production of butyl alcohol and acetone, and that under plant conditions the ratio is fixed within rather narrow limits. In view of the fluctuating prices and market demands, however, it may be desirable to change the ratio of butyl-acetone production; that is, to increase the acetone and lower the butyl alcohol proportion. In accordance with my invention this change can be accomplished by continuing the number of transfers of the culture through the liver-virus treatment, as above described, until the desired ratio is reached. The treatment is then discontinued, and the strains can be maintained in stock in their then-attained condition by holding as dry spore stock on sterile soil. The following will illustrate ratios of which Clostridium madisonii is capable under this procedure.

|  | Acetone, percent of total solvent |
|---|---|
| Original or natural condition | 18–22 |
| After one series (3 to 5) liver transfers | 28–34 |
| After three series (9 to 15) liver transfers | 43–46 |

It is apparent that Clostridium madisonii may be used in two ways in commercial operation of the fermentation; i. e., in the absence of the filterable agent or in its presence or potential presence. In the former case, the results as set forth in Examples I–IV may be expected to obtain. In the latter case, that is, in presence of virus, it is at present economical to use a treated culture of relatively low acetone yield, such as 28–30 per cent. It is to be understood, however, that if it were commercially desired to use a strain of higher acetone yield, its production would be determined as above.

The following actual plant fermentations in the presence of virus are offered by way of example of the currently desired production of greater yield of butyl alcohol than of acetone.

*Example V*

|  | I | II | III |
|---|---|---|---|
| Puerto Rican molasses sugar grams per liter | 53.0 | 53.5 | 55.4 |
| (NH₄)₂SO₄ do | 3.0 | 3.0 | 2.0 |
| CaCO₃ do | 5.0 | 5.0 | 4.0 |
| Total volume mash gallons | 65,000 | 65,000 | 65,174 |
| Initial Brix | 9.4 | 11.4 | 9.8 |
| Final Brix | 4.4 | 4.9 | 4.55 |
| Initial pH | 6.2 | 6.2 | 6.0 |
| Final pH | 5.65 | 5.8 | 5.7 |
| Time of fermentation hours | 54 | 57 | 60 |
| Solvents gm./l | 15.7 | 15.2 | 15.8 |
| Percent on sugar | 29.6 | 28.4 | 28.8 |
| Acetone percent of solvent | 28.1 | 27.4 | 28.2 |

I claim:

1. A process of producing butyl alcohol and acetone from carbohydrate mash, which consists in inoculating the mash with a culture of Clostridium madisonii, and permitting the fermentation to proceed, and recovering said products.

2. A process for the production of butyl alcohol and acetone by fermentation of carbohydrate mash with a culture of Clostridium madisonii, such mash having an initial sugar concentration of about 5 to 6 per cent and an initial pH of preferably 6.0 to 6.5, and the fermentation being carried out at about 31° C.

3. A process for the production of butyl alcohol and acetone from fermentable molasses mash which consists in subjecting the mash to the action of butyl alcohol producing bacteria which have been previously cultivated in a medium whose principal ingredients are liver infusion, a bacteriological peptone, and a low concentration of fermentable carbohydrate, and with a concentration of virus affecting the fermentation activity of the bacteria in excess of that which would inhibit fermentation if in the mash.

4. In a process for the production of butyl alcohol and acetone from molasses mash by butyl alcohol producing bacteria, the improvement which consists in increasing the yield of acetone over that of the normal yield by previously cultivating the bacteria in a nutrient high nitrogen low carbohydrate content medium in the presence of a concentration of virus affecting the fermentation activity of the bacteria greatly in excess of that which would be inhibiting if in the mash, said nutrient medium having the property of preventing the inhibiting action of the virus in the medium, then inoculating the mash with said culture, permitting the fermentation to proceed and recovering the products.

5. A process of production of butyl alcohol and acetone from uninverted molasses mash, which consists in subjecting a culture of Clostridium madisonii to repeated transfers in the presence of a concentration of virus affecting the fermentation activity of Clostridium madisonii in a nutrient medium of high nitrogen low carbohydrate ratio to prevent the inhibiting action of the virus on the bacteria in the medium, and thereafter inoculating the molasses mash therewith, whereby yields of solvent are obtained having the proportion of acetone higher than when the mash is inoculated with an untreated culture of *Clostridium madisonii*.

6. A process for the production of butyl alcohol and acetone from molasses mash, which consists of subjecting the mash to the action of butyl alcohol producing bacteria which have been previously cultivated in a nutrient medium different from the mash and with a concentration of virus affecting the fermentation activity of the bacteria in excess of that which would inhibit fermentation if in the mash, said medium being of high nitrogen low carbohydrate ratio to prevent the inhibiting action of said virus on the bacteria in the medium.

7. A process for the production of butyl alcohol and acetone from fermentable molasses mash, which consists of subjecting the mash to the action of a strain of *Clostridium madisonii*, which has been developed in the presence of a concentration of virus affecting the fermentation of *Clostridium madisonii* in a nutrient medium of high nitrogen low carbohydrate ratio to prevent the inhibiting action of the virus in the medium, whereby the yield of acetone is in excess of the normal range of 20 per cent. based on the weight of sugar.

8. A process for the production of butyl alcohol and acetone from fermentable molasses mash, which consists of subjecting the mash to the action of a strain of *Clostridium madisonii* so treated by serial culture in the presence of a concentration of the virus affecting the fermentation activity of *Clostridium madisonii* in excess of that which would be inhibitory in the mash, in a nutrient high nitrogen, low carbohydrate ratio medium protective against the inhibiting action of the virus in the medium, whereby to effect an increase in yield of acetone between 25 to in excess of 40 per cent. based on the weight of sugar.

ELIZABETH F. McCOY.